United States Patent [19]
Thomas

[11] Patent Number: 5,791,098
[45] Date of Patent: Aug. 11, 1998

[54] REINFORCED STRUCTURE FOR BELOW-GRADE HOUSING OF EQUIPMENT

[75] Inventor: Jeffrey G. Thomas, Northridge, Calif.

[73] Assignee: Cott Manufacturing Co., Glendale, Calif.

[21] Appl. No.: 719,173

[22] Filed: Sep. 24, 1996

[51] Int. Cl.[6] .................................................. E02D 29/00
[52] U.S. Cl. ........................... 52/169.6; 52/19; 52/169.7; 220/4.28; 220/484; 405/52
[58] Field of Search ............................ 52/19, 20, 139, 52/140, 141, 142, 169.6, 169.7; 220/4.28, 484, 618, 693; 405/52, 53

[56] References Cited

U.S. PATENT DOCUMENTS

| | | | |
|---|---|---|---|
| 1,920,101 | 7/1933 | Nagel | 52/142 |
| 3,618,275 | 11/1971 | Ance | 52/101 X |
| 3,893,584 | 7/1975 | Ledford | 220/484 X |
| 3,968,601 | 7/1976 | Brown et al. | 52/19 X |
| 3,982,650 | 9/1976 | Ichihara | 220/4.28 |
| 4,163,503 | 8/1979 | McKinnon | 220/484 |
| 5,362,174 | 11/1994 | Yang | 52/20 X |
| 5,535,915 | 7/1996 | McKinnon | 220/484 |

*Primary Examiner*—Carl D. Friedman
*Assistant Examiner*—Timothy B. Kang
*Attorney, Agent, or Firm*—Clifford A. Poff

[57] ABSTRACT

An enclosure for buried placement near grade capable of supporting vehicle loading having a reinforced cover, walls and base, the walls including internal struts and stabilizers, the cover and walls including notches for transferring load and grooves for limiting translation and rotation of the cover under transverse load. The base and the walls having portions of divided pathways forming conduit openings when the base is connected to the walls.

13 Claims, 5 Drawing Sheets

REINFORCED STRUCTURE FOR BELOW-GRADE HOUSING OF EQUIPMENT

BACKGROUND OF THE INVENTION

1. Field of the Invention

The present invention relates to an equipment enclosure, and, more particularly, to an accessible equipment enclosure for buried placement near grade.

2. Description of the Prior Art

It is desirable for public utilities, such as telephone and electric companies, to use underground distribution, particularly in residential areas to eliminate the unsightly presence and clutter associated with poles and overhead lines. However, these systems utilize components, such as cable junctions, which may require periodic inspection or service. Therefore, it is desirable to provide an enclosure for such components into which a person can have access. These enclosures may also need to be placed in traffic areas within an urban region requiring that the enclosure be capable of withstanding forces placed on it by vehicle traffic.

It is also desirable to have the component parts of the enclosure incorporate cross sections that possess the required structural capability without becoming unduly heavy, thereby facilitating handling and installation at the site. The use of the modular design of the present invention also allows for on-site attachment of the components to form the enclosure, such on-site construction capable within limited clearances.

The apparatus being enclosed often involves sensitive equipment such as fiber optic cabling which may carry large amounts of information in a relatively small cross section affecting a large number of persons. Therefore it is desirable to provide for replacement of a damaged component without disruption of the apparatus being housed within the enclosure.

Accordingly, it is an object of the present invention to provide an enclosure for buried placement near grade which is capable of supporting vehicle traffic while incorporating a structural design that limits the overall weight.

It is a further object of the present invention to provide an enclosure having a modular design that is capable of installation within a limited external clearance.

It is yet a further object of the present invention to provide an enclosure providing an integral conduit opening allowing for replacement of component parts of the enclosure without disturbing apparatus passing into and out of the enclosure.

SUMMARY OF THE INVENTION

According to the present invention, there is provided an equipment enclosure for buried placement near grade, the enclosure including upstanding walls in a spaced apart relationship forming a closed section capable of withstanding vehicle traffic loading, each of the walls having a first end, an opposite second end, an inner side facing an interior of the enclosure and an opposite outer side. The enclosure further includes a cover having a mechanical strength sufficient to withstand vehicle traffic loading, the cover having a lower side supported substantially at an outer periphery thereof by the first ends of the walls, the cover including means for transferring vertical loading from the cover to the inner sides of the walls, such as through the use of interfitting notched portions in the inner sides of the walls and around the outer periphery of the cover, the cover further including means located substantially at the outer periphery for preventing translation and rotation of the cover relative to the walls, such as through the use of projections extending from the cover for interfit within grooves in the notched portion of the walls. The enclosure also includes means attached to the second end of at least two of the walls for maintaining the spaced apart relationship of the walls, such as a base having a floor and upstanding members extending from the edges of the floor having outwardly turned flange portions for seating of the second ends of the walls. The base may be attached to the spaced apart walls through the use of connecting plates each attached to the second end of one of the walls and to an upstanding member of the base.

BRIEF DESCRIPTION OF THE DRAWINGS

The present invention will be more fully understood when the following description is read in light of the accompanying drawings in which.

DETAILED DESCRIPTION OF THE DRAWINGS

Figure 1:
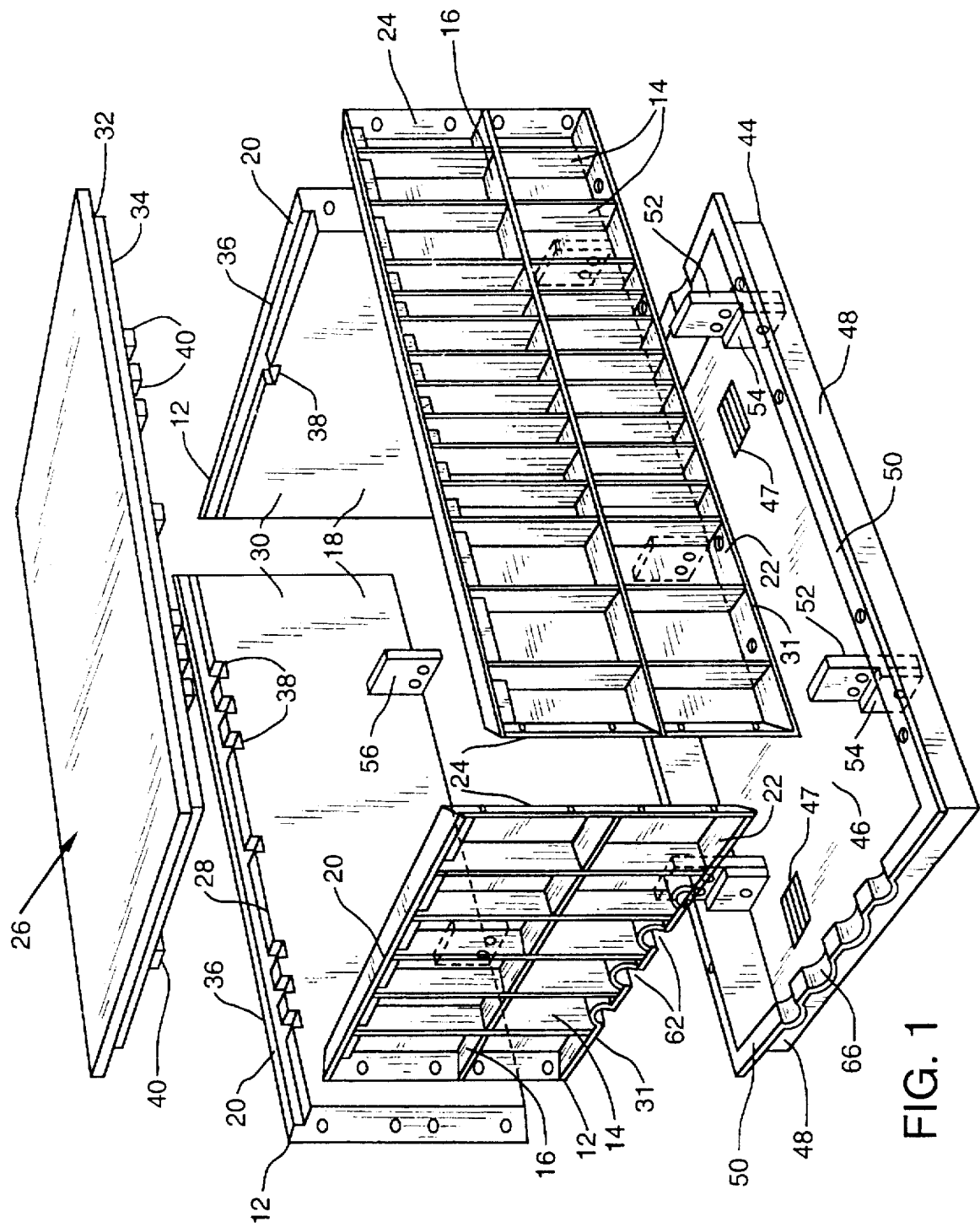
FIG. 1 is an exploded perspective of an enclosure according to the present invention.
Figure 2:
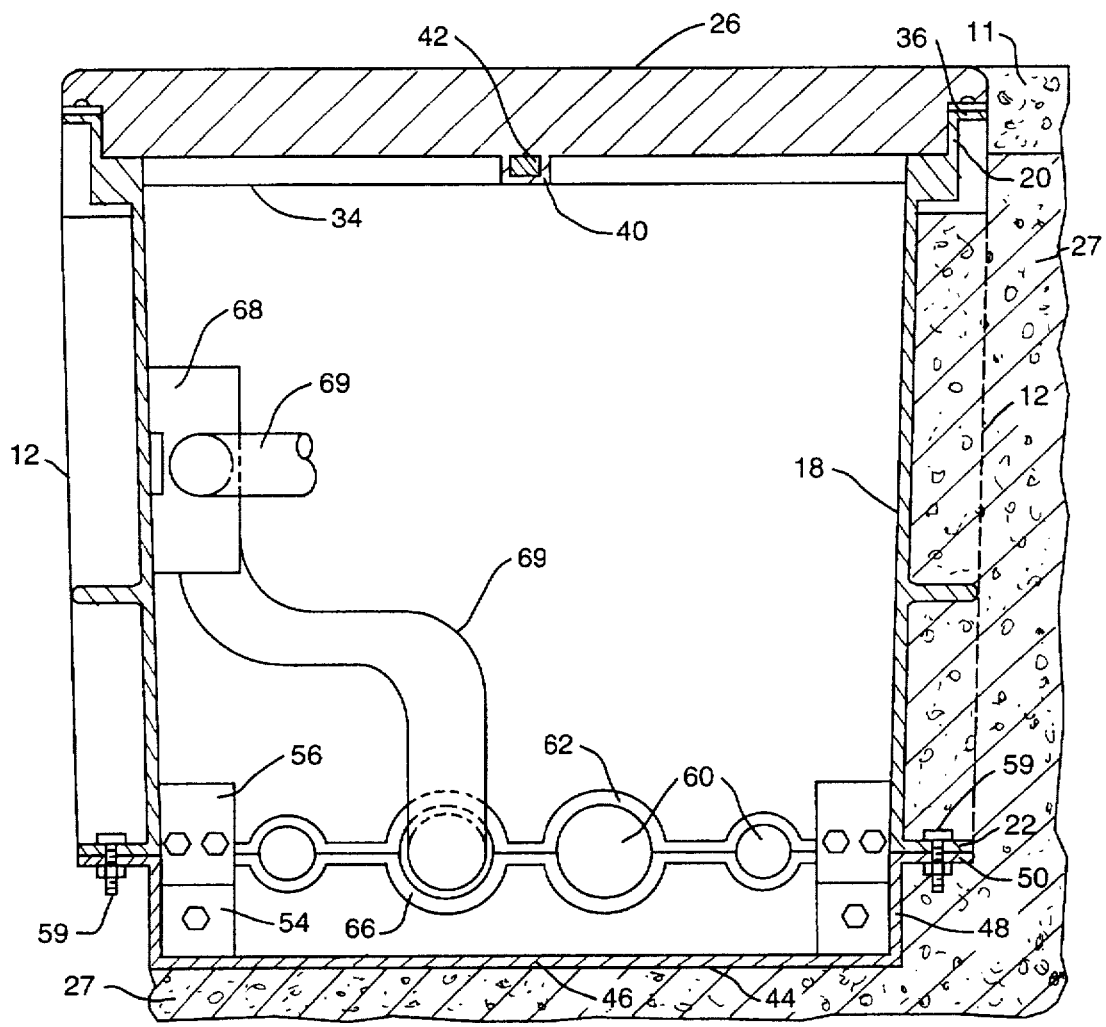
FIG. 2 is a sectional view of the enclosure of FIG. 1 taken at a location between cover projections.

An enclosure 10 according to the present invention is shown in FIG. 1. The enclosure is capable of buried placement near grade, as shown in FIG. 2, to provide housing for equipment, such as telephone cable junctions in residential areas, which may require servicing but under normal circumstances will not be seen. The equipment to be enclosed may also include splice cases, optical network units, cable safety coils and terminal housings. The enclosure is also intended for use in traffic areas, as is indicated in FIG. 2 where the enclosure is shown to be located flush with an asphalt surface 11, and must therefore be capable of withstanding the loading from vehicle traffic as will be discussed below. The scope of the present invention includes manhole enclosures which provide sufficient accessibility for a person to fully enter, and handhole enclosures which differ only in size from the manhole enclosures and provide access sufficient for a person's hands to reach the enclosed equipment.

The enclosure includes walls 12 which are combined in a spaced apart relationship to form a closed cross-section, which is rectangular in the preferred embodiment. The walls include struts 14 extending between ends of the walls for carrying vertical loading in compression. Extending between the struts at an intermediate point along elongated lengths of the struts are stabilizers 16 which serve to prevent buckling of the struts under compressive loading of the struts. The stabilizers 16 are shown to be at substantially equal distances from opposing ends of the walls 12 to maximize the buckling prevention which can be provided by the stabilizers. The use of the struts and stabilizers, as opposed to a solid section of the same material having the same weight, more fully optimizes the compressive load carrying capability of the wall. This construction also possesses increased structural resistance to side deflection, as from earth loading, over a solid section of the same weight due to the increase in the bending moment of inertia.

Figure 3:
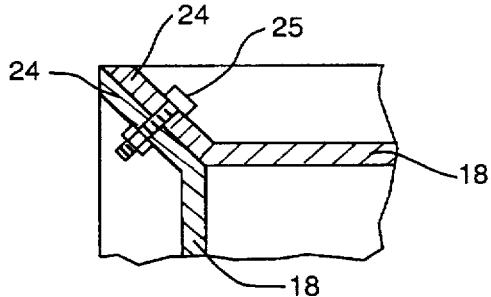
FIG. 3 is a partial top sectional view showing the connection of two of the walls to one another.

Each of the walls also includes a facing sheet 18 forming an inwardly directed surface upon enclosure assembly, as well as a top member 20 extending along a first end of the wall and a bottom member 22 extending along a second end of the wall, the members 20, 22 located at opposing ends of the struts 14. The walls also include mitered edges 24 located between the top and bottom members, the edges being fastened together, using bolts 25 as shown in FIG. 3, to form the closed section. This modular design facilitates storage and handling of the enclosure by allowing for on-site assembly of the individual walls to form the rectangular section. The use of a modular design also makes possible the on-site replacement of an individual wall without disturbing equipment within the enclosure, such as cable, which may have been fed through conduit openings in another wall as will be discussed below. While the preferred embodiment is shown to involve a closed section for the wall assembly that is rectangular, other closed sections made from modular wall segments are conceivable, such as an oval or circular section made from opposing arcuate walls, or a hexagonal section.

The combination of elements that includes struts 14, stabilizers 16, top member 20, bottom member 22 and mitered corners 24 form an assembly having a set of compartments which will provide for an interlocking relationship with the surrounding soil 27, as seen in FIG. 2, when the enclosure is in place below grade. The soil will likely surround all four of the walls of the enclosure but has been shown cut away from one of the walls in FIG. 2 and FIG. 6 for clarity of the view. The "soil locking" feature of the enclosure which is provided by the interlocking relationship of the soil with the outsides of the walls will be especially valuable in those areas, such as southern Louisiana, where water pressures from the high water table could provide heaving forces tending to cause a smooth sided box to be lifted.

Figure 4:
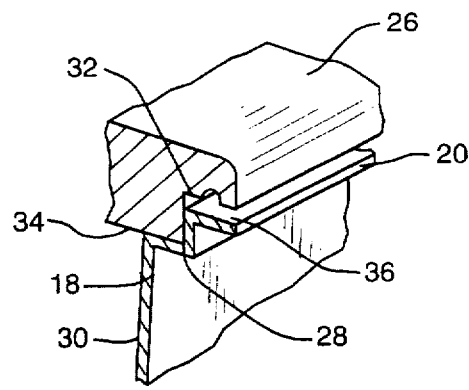
FIG. 4 is a partial perspective illustrating the load transferring area of the cover and one of the walls.

The walls 12 support a cover 26 in such a manner that vertical loading from the cover is transferred to an inner side 30 of each of the walls in the following manner. Each of the walls has a notched portion 28 at an end of the wall along the inner side 30 of the wall which will serve as a load bearing surface for the cover. As clearly seen in FIG. 4, the notched portion 28 extends outwardly from the inner side forming a recess into the first end of the wall for receiving the cover 26. The cover 26 also has a notched portion 32 formed around the outer periphery of the cover on a lower side 34 of the cover to create a load transferring surface on said cover when the notched portion of the cover interfits with the notched portions of the walls. As best seen in FIG. 4, the depths of the respective notches are toleranced so that contact between the cover and the walls will occur between the lower side 34 of the cover and the notched portions 28 along the inner side 30 of the walls while a gap will exist between the notched portion 32 of the cover and an outer portion 36 of the top members 20.

Figure 6:
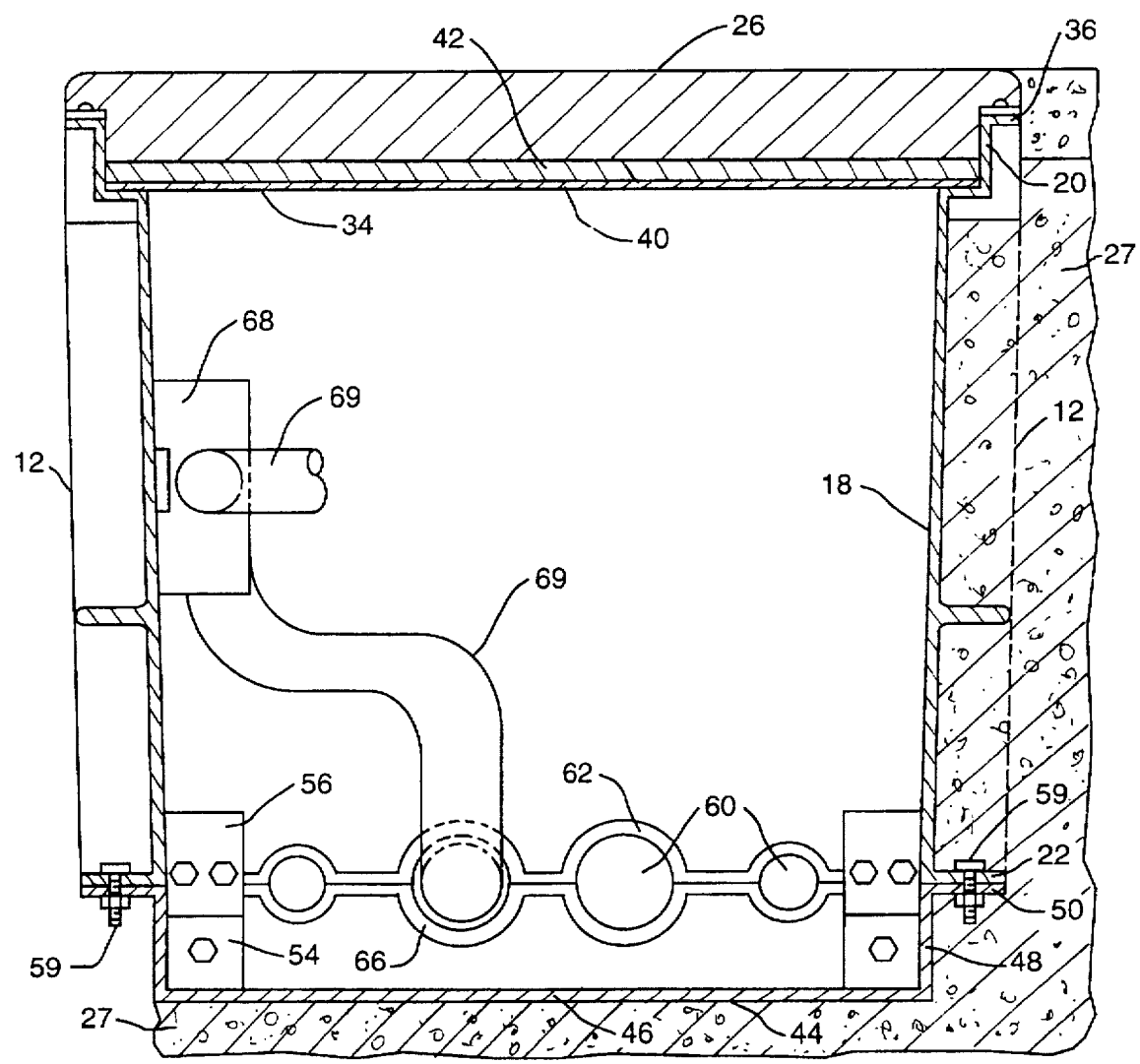
FIG. 6 is a sectional view of an enclosure according to the present invention taken at the location of a cover projection.

The cover also includes means to secure the cover against translation and rotation relative to the walls. This feature is desirable since the cover will also be subjected to horizontal loading from the vehicle traffic in addition to the vertical load imposed. The securing means in the preferred embodiment includes grooves 38 formed in the notched portions 28 of each of the walls 12. These grooves 38 are sized and spaced for an interfitting relationship with projections 40 extending from the lower side 34 of the cover. The projections, by extending between ends of the cover also provides an advantageous location for the placement of reinforcing members 42, as shown in FIGS. 2 and 6. When the cover is subjected to a vertical load, such as from vehicle traffic, bending moments will develop in the cover resulting in tensile forces on the lower side of the cover. The addition of reinforcing members 42 on the lower side of the cover serves to increase the mechanical strength of the cover.

Figure 7:
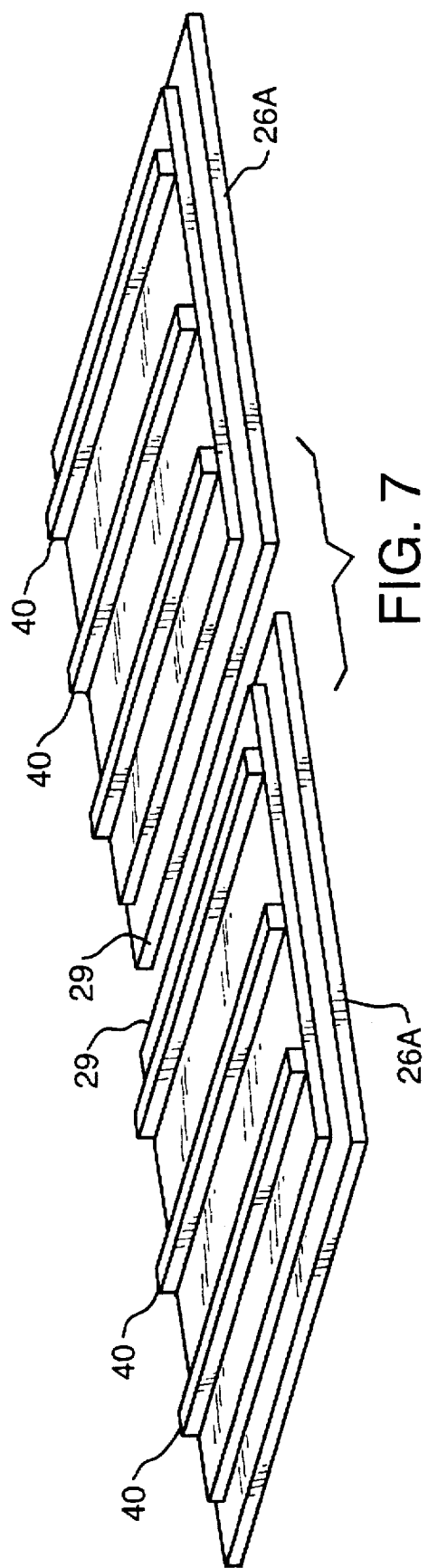
FIG. 7 is a perspective view of an inverted segmented cover according to the present invention.

The cover as shown in FIG. 1 is a single section. To facilitate handling of the cover, an alternative design incorporates a segmented cover as seen in FIG. 7. Each of the segments 26A carries three equally spaced projections 40. The location of the segment separation along the width of the cover, as opposed to the length of the enclosure, results in shorter unsupported free edges 29 for the segments and therefore a stronger enclosure design.

By including the projections, the reinforcing members may be located further from the inertial center of the cross section thereby increasing the structural capability of the cross section without requiring an increase in thickness for the entire section. In the preferred embodiment, the enclosure is made of polyurethane and the reinforcing members are steel. The reinforcing members 42 are shown as being solid in cross section, although other closed sections such as box beam may be used.

The cover and the walls are supported on a base 44. The base includes a floor 46 extending between the walls 12. Upstanding members 48 of the base extend from the edges of the floor and include outwardly turned flange portions 50 at the terminal ends of the upstanding members onto which the second ends 31 of the walls 12 are seated. In addition to serving as a vertical support, the outwardly turned flanges 50, combine with the upstanding members 48 and floor 46 to form reinforcement for the walls against lateral load, from earth loading for example, because of the connection of the walls to the base.

Figure 5:
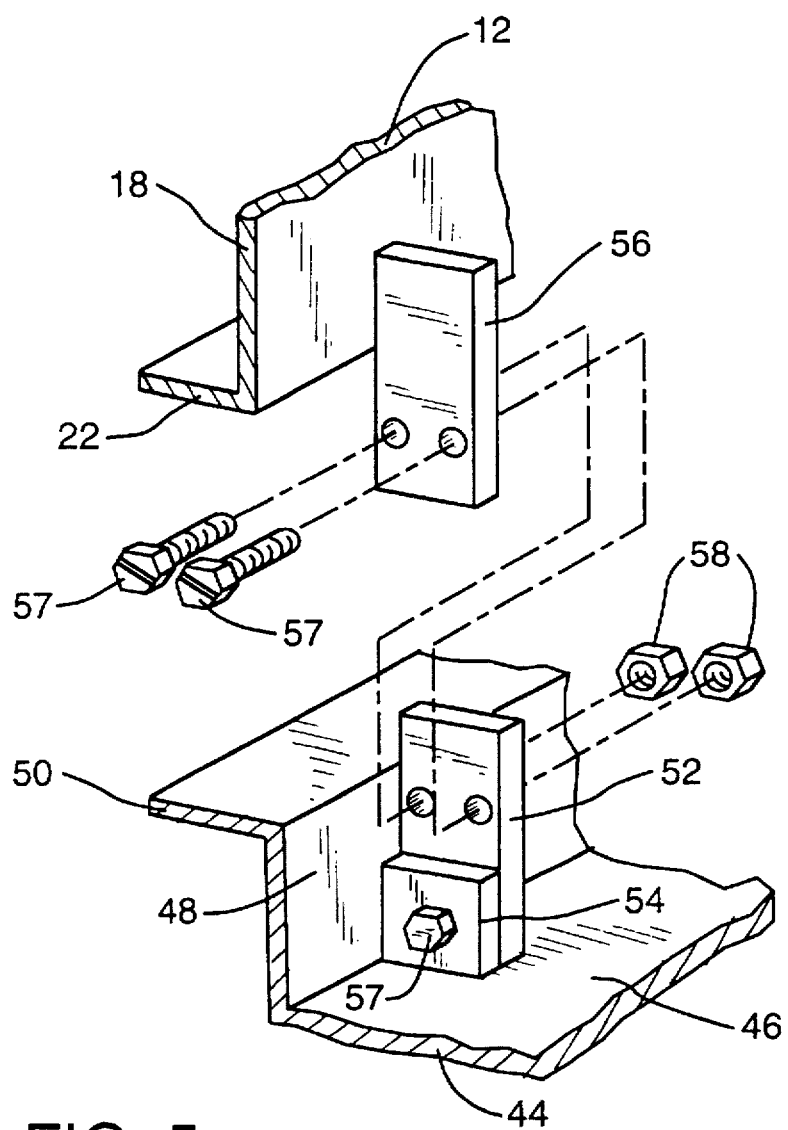
FIG. 5 is a partial perspective showing the connection of the base to one of the walls.

The assembled walls are attached to the base, such as by fastening of connecting plates 52, shown located along the two opposing walls not carrying conduit openings. As best seen in FIG. 5, each connecting plate 52 is connected to support bosses 54, 56 which extend from the base and the wall, respectively. The connection is made through bolts 57 and associated nuts 58. Since the connection occurs in the inner portion of the enclosure, the use of this type of connection allows for on-site assembly of the walls to the base within an opening providing limited external clearance. This eliminates the need for excavation otherwise required for clearance for an on-site external connection of the walls to the base.

The base is also connected to the second ends of the walls using bolts 59, as seen in FIG. 2, each of which passes through bottom member 22 of a wall 12 and flange 50 of base 44. The primary function of the bolts 59 is to provide a shear connection between the assembly of walls and the base. Such a shear connection could also be provided through the use of pins passing between the components, although the bolted connection provides a more stable connection.

The inclusion of the base having a floor serves to maintain the spaced apart relationship of the walls and to provide a foundation for the cover and walls. However, other wall support means are conceivable that do not incorporate a floor extending between the walls, such as a reinforcing rim or frame, as long as a suitable foundation is provided or is present. The floor includes openings 47 for drainage of water since the enclosure is not intended to be watertight.

The enclosure also includes conduit openings 60 in opposing ends of the enclosure each of which provides a pathway into and out of the enclosure for a utility conduit containing elements such as equipment cabling. Each of the conduit openings 60 includes a concave portion 62 formed in the bottom member 22 of the wall 12, and a concave portion 66 formed in the upstanding member 48 of the base 44 including the outwardly turned flange portion 50. When the wall containing the concave portion 62 is seated on the flanged portion 50 of the base containing the concave portion 66, the concave portions confront each other thereby forming the conduit opening 60.

As discussed above, the modular design makes possible replacement of a wall without disturbing equipment such as cabling which pass through the conduit openings in one of the other walls. Where relatively sensitive apparatus is used, such as fiber optics carrying large amounts of information in a relatively small cross section, the ability to replace portions of the enclosure without having to disturb the apparatus is a valuable feature to the invention.

As seen in FIG. 2, it may be desirable to form an interconnection for the apparatus, such as cabling, which is fed through the conduit openings of the enclosure. A junction box 68 is shown mounted on one of the walls of the enclosure from which conduit 69 carrying such cabling is interconnected for separate routing and exit from the enclosure through a conduit opening 60. Mounting the juncture on one of the walls in this fashion helps to limit exposure to water as compared with a location along the floor.

The use of the struts and stabilizers in the walls and the projections on the cover carrying encapsulated steel, to achieve greater structural capability for a given weight, makes polyurethane a desirable material choice given the relative ease in forming the components together with the encapsulating characteristic of the material in regards to the reinforcing members. Structural testing of the embodied enclosure made of polyurethane and having approximate dimensions of 36 inches by 60 inches, was performed in accordance with ASTM and MCIT 048/200/6505 standards. The enclosure withstood repeated vertical loading placed on the cover of the assembled enclosure of 20800 pounds. In addition, the enclosure withstood repeated vertical loading of 20800 pounds placed directly on an end of one of the long walls.

The selection of polyurethane also provides additional desired characteristics including resistance to chemical attack which is superior to other materials of construction such as steels or concrete, and also allows for relatively low weight construction which possesses the required structural capability. The enclosure used in the above discussed structural testing, for example, weighs approximately 250 pounds. In addition, the polyurethane naturally exhibits excellent surface slip resistance characteristics. The upper side of the cover 26 was tested in accordance with the American Society for Testing Materials (ASTM) C1028-89, "Standard Test Method for Determining the Static Coefficient of Friction of Ceramic Tile and Other Like Surfaces by the Horizontal Dynamometer Pull-Meter Method". This testing resulted in a measured static coefficient of friction, which represents the ratio of the horizontal load which is required to overcome frictional forces to the vertical load applied, of approximately 0.80. The polyurethane can also be made to be flame retardant which may be important in certain applications to protect the enclosed equipment in the event of a fire.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. An equipment enclosure for buried placement near grade, the enclosure including:
   (a) upstanding walls in a spaced apart relationship forming a closed section capable of withstanding vehicle traffic loading, each of said walls having a first end, an opposite second end, an inner side facing an interior of said enclosure and an opposite outer side, each of the first ends having a notched portion extending outwardly from the inner side thereby forming a recess in the first end, at least one of the walls having at least one groove formed in the notched portion;
   (b) a cover having a mechanical strength sufficient to withstand vehicle traffic loading, said cover having a lower side supported substantially at an outer periphery thereof by the first end of said walls, said cover including a notched portion extending along the outer periphery such that the lower side of the cover is received in the recesses in the first end of the walls and contact is prevented between the cover and the outer side of each of the walls and such that vertical loading is directly transferred from said cover to the outwardly extending notched portion of said walls, said cover further including at least one projection extending from said lower side for interfit within said groove in the notched portion of said at least one of the walls for preventing translation and rotation of said cover relative to said walls; and
   (c) a base attached to the second end of at least two of said walls, the base supporting each of said walls and maintaining the spaced apart relationship of said walls.

2. The enclosure according to claim 1, wherein the base includes upstanding members each of which operably supports one of said walls and a floor extending between said upstanding members.

3. The enclosure according to claim 2, wherein the base further includes outwardly turned flange portions extending from said upstanding members for supporting the second ends of said walls, and wherein the enclosure further includes a plurality of connecting plates each attached to the second end of one of said walls and to an upstanding member of the base.

4. The enclosure according to claim 3, wherein at least one upstanding member of said base and the extending flange portion includes at least one concavity and wherein the second end of at least one wall includes at least one concavity such that when said base is connected to said walls the concavity in the base confronts the concavity in the second end of a wall thereby forming a conduit opening in the enclosure.

5. The enclosure according to claim 2, wherein said floor includes at least one opening.

6. The enclosure according to claim 2, wherein at least one upstanding member of said base includes at least one concavity and wherein the second end of at least one wall includes at least one concavity such that when said base is connected to said walls the concavity in the base confronts the concavity in the second end of a wall thereby forming a conduit opening in the enclosure.

7. The enclosure according to claim 1, wherein the enclosure is made of polyurethane and wherein said cover contains encapsulated steel reinforcement.

8. The enclosure according to claim 1, wherein the cover is made of polyurethane, and wherein at least two of the spaced apart walls have at least one groove and the at least one projection extends between the grooves of the at least two walls and wherein the projection contains steel reinforcement encapsulated by the polyurethane.

9. The enclosure according to claim 8 wherein the encapsulated reinforcement has a box beam cross section.

10. The enclosure according to claim 1, wherein each of the walls includes spaced apart struts extending between the first and second ends of the walls for carrying vertical loading, each of said walls further including a stabilizer extending between said struts for preventing buckling of the struts.

11. The enclosure according to claim 10, wherein each of the walls further includes a top member forming the first end of the wall, a bottom member forming the second end of the wall, and a facing sheet extending between the ends forming an inner surface of the wall such that the struts, stabilizers, top member and bottom member combine to form a set of compartments which interact with soil upon placement of the enclosure below grade thereby forming a soil locking mechanism which serves to resist heaving forces.

12. The enclosure according to claim 10, wherein said stabilizer is located at substantially equal distances from the first end and the second end of said wall.

13. The enclosure according to claim 1, wherein the enclosure includes four walls and the spaced apart relationship of said walls is rectangular, and wherein said walls have mitered edges extending between the ends which are bolted together to form said closed section.

\* \* \* \* \*